(12) United States Patent
Kawana

(10) Patent No.: US 10,345,585 B2
(45) Date of Patent: Jul. 9, 2019

(54) HEAD-UP DISPLAY DEVICE

(71) Applicant: FUJIFILM Corporation, Tokyo (JP)

(72) Inventor: Masanao Kawana, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/895,146

(22) Filed: Feb. 13, 2018

(65) Prior Publication Data

US 2018/0231775 A1    Aug. 16, 2018

(30) Foreign Application Priority Data

Feb. 16, 2017  (JP) ................. 2017-026716

(51) Int. Cl.
| | |
|---|---|
| *G02B 27/01* | (2006.01) |
| *B60K 35/00* | (2006.01) |
| *G02B 17/06* | (2006.01) |
| *G02B 5/00* | (2006.01) |

(52) U.S. Cl.
CPC .......... *G02B 27/0101* (2013.01); *B60K 35/00* (2013.01); *G02B 5/005* (2013.01); *G02B 17/0605* (2013.01); *B60K 2350/2056* (2013.01)

(58) Field of Classification Search
CPC .. G02B 27/01; G02B 27/017; G02B 27/0101; G02B 27/143; G02B 27/0172; B60K 2350/941; B60K 2350/2052
See application file for complete search history.

(56) References Cited

U.S. PATENT DOCUMENTS

| | | | | |
|---|---|---|---|---|
| 6,227,667 B1* | 5/2001 | Halldorsson | ......... | G02B 27/017 351/206 |
| 2013/0063754 A1* | 3/2013 | Saisho | ................. | G02B 5/0257 358/1.13 |
| 2014/0266986 A1* | 9/2014 | Magyari | ............ | G02B 27/0172 345/8 |
| 2014/0320974 A1* | 10/2014 | Magyari | ............ | G02B 27/0172 359/631 |
| 2015/0168730 A1* | 6/2015 | Ashkenazi | ......... | G02B 27/0172 359/631 |
| 2016/0048017 A1* | 2/2016 | Kasahara | ........... | G02B 27/0101 359/633 |

FOREIGN PATENT DOCUMENTS

WO    2016/079926 A1    5/2016

* cited by examiner

*Primary Examiner* — Sultan Chowdhury
(74) *Attorney, Agent, or Firm* — Studebaker & Brackett PC

(57) ABSTRACT

A head-up display device includes a first mirror having power, a second mirror having power, and a light-blocking member that is provided with an aperture. An image reflective surface has a convergence action. Display light emitted from an image display surface is reflected by the first mirror and the second mirror in this order, passes through the aperture, and reaches the image reflective surface. The image display surface is disposed on the same side as an observer and on a side opposite to the first mirror with respect to luminous flux that travels toward the aperture from the second mirror. The first mirror is a concave mirror. The shape of the cross-section of the second mirror taken along a front-rear direction is a convex shape.

3 Claims, 6 Drawing Sheets

EXAMPLE 1

EXAMPLE 2

EXAMPLE 3

REFERENCE EXAMPLE 1

HEAD-UP DISPLAY DEVICE

CROSS REFERENCE TO RELATED APPLICATIONS

The present application claims priority under 35 U.S.C. § 119 to Japanese Patent Application No. 2017-026716 filed on Feb. 16, 2017. The above application is hereby expressly incorporated by reference, in its entirety, into the present application.

BACKGROUND OF THE INVENTION

1. Field of the Invention

The present invention relates to a head-up display device that reflects display light of an image, which is displayed on an image display surface, toward an observer by an image reflective surface facing the observer to enlarge and display the image as a virtual image to the observer behind the image reflective surface.

2. Description of the Related Art

In the past, a head-up display device has been known as a device that displays information, such as the indication of a direction, calling for attention, and a travel speed, to a driver of an automobile or the like. The head-up display device is to project the virtual image of an image, which is to be displayed, to an image reflective surface, such as a front window or a combiner, so that a driver can recognize information required for the driving of an automobile or the like without taking his eyes off the field of view. WO2016/079926A is proposed as such a head-up display device.

SUMMARY OF THE INVENTION

Since the head-up display device needs to be installed in a limited space around a driver's seat of a moving body, such as an automobile, the head-up display device is required to be small.

Further, a method, which is called augmented reality (AR) for displaying information about navigation and/or information about facilities so as to correspond to the scenery that is seen behind a front window, has been proposed in a head-up display device in recent years. In a case in which AR contents are to be displayed, information is not effective if information is not displayed so as to exactly correspond to each of the facilities and/or the position of the road in the scenery that is seen behind the front window. Accordingly, the display position and angle of a virtual image need to be exactly set in consideration of the position of the driver's eyes.

Incidentally, a range in which a driver can appropriately observe a virtual image, that is, an eye box is set in a head-up display device. The eye box is set in a range in which the driver's eyes are assumed to be positioned in a case in which a driver appropriately poses to drive a vehicle. Since the position of the driver's seat in a lateral direction is generally fixed, the driver's eyes are unlikely to deviate from the eye box in the lateral direction. However, since the positions of the driver's seat in a front-rear direction and a vertical direction are generally adjustable and the driver's height and the driver's driving postures vary, the driver's eyes are likely to deviate from the eye box in the vertical direction.

A method of making the position of the eye box in the vertical direction be capable of being adjusted by rotating a display unit of the head-up display device in the front-rear direction of the vehicle so as to correspond to the positions of the pupils of the driver is considered to solve this problem. However, since the display depression angle of a virtual image is changed in this case, the method is not suitable to display AR contents.

Accordingly, a head-up display device, of which the eye box is widened in the vertical direction and which has a small size and can appropriately display a virtual image to various drivers, is requested. However, a small head-up display device that bends an optical path by two mirrors is disclosed as the device of WO2016/079926A, but does not have the sufficiently wide range of the eye box in the vertical direction.

The invention has been made in consideration of the above-mentioned circumstances, and an object of the invention is to provide a head-up display device which has a small size and of which the range of an eye box in a vertical direction is wide.

A head-up display device of the invention reflects display light of an image, which is displayed on an image display surface, toward an observer by an image reflective surface facing the observer to enlarge and display the image as a virtual image to the observer behind the image reflective surface. The head-up display device includes a first mirror having power, a second mirror having power, and a light-blocking member that is provided with an aperture. The image reflective surface has a convergence action. Display light emitted from the image display surface is reflected by the first mirror and the second mirror in this order, passes through the aperture, and reaches the image reflective surface. The image display surface is disposed on the same side as the observer and on a side opposite to the first mirror with respect to luminous flux that travels toward the aperture from the second mirror. The first mirror is a concave mirror. A shape of a cross-section of the second mirror taken along a front-rear direction is a convex shape in a case in which a direction of luminous flux traveling toward the first mirror from the image display surface is set to the front-rear direction on a reflective surface of the second mirror.

Here, the "image display surface" includes not only the image display surface of an image display element but also an image display surface of a diffusion member in a case in which an image displayed on the image display element is temporarily projected to the diffusion member, such as a diffuser, to widen the range of the pupil position of the observer in which a virtual image can be appropriately observed (hereinafter, written as an eye box).

In the head-up display device of the invention, it is preferable that a shape of an end portion of the second mirror, which is close to the observer, in a lateral direction is a concave shape in a case in which a direction orthogonal to the front-rear direction is set to the lateral direction on the reflective surface of the second mirror.

In this case, a shape of an end portion of the second mirror, which is close to the first mirror, in the lateral direction may be a concave shape and may be a convex shape.

A head-up display device of the invention reflects display light of an image, which is displayed on an image display surface, toward an observer by an image reflective surface facing the observer to enlarge and display the image as a virtual image to the observer behind the image reflective surface. The head-up display device includes a first mirror having power, a second mirror having power, and a light-blocking member that is provided with an aperture. The image reflective surface has a convergence action. Display light emitted from the image display surface is reflected by the first mirror and the second mirror in this order, passes through the aperture, and reaches the image reflective surface. The image display surface is disposed on the same side as the observer and on a side opposite to the first mirror with respect to luminous flux that travels toward the aperture from the second mirror. The first mirror is a concave mirror. A shape of a cross-section of the second mirror taken along a front-rear direction is a convex shape in a case in which a direction of luminous flux traveling toward the first mirror from the image display surface is set to the front-rear direction on a reflective surface of the second mirror. Accordingly, a head-up display device which has a small size and of which the range of an eye box in a vertical direction is wide can be obtained.

DESCRIPTION OF THE PREFERRED EMBODIMENTS

Figure 1:
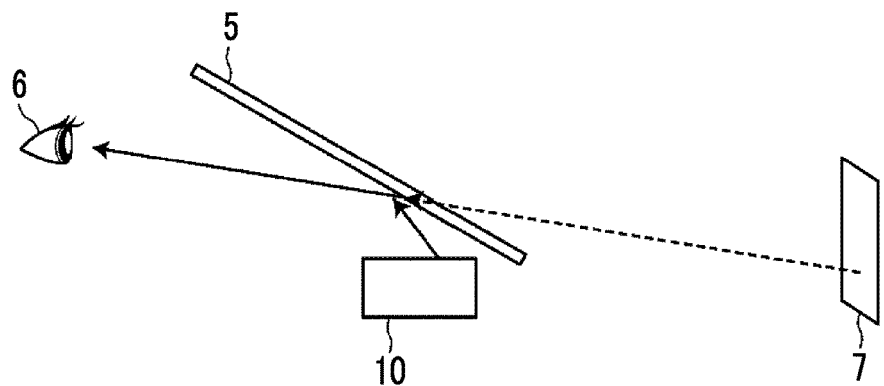
FIG. 1 is a schematic diagram of a driver's seat of an automobile on which a head-up display device according to an embodiment of the invention is mounted.

An embodiment of the invention will be described in detail below with reference to drawings. FIG. 1 is a schematic diagram of a driver's seat of an automobile on which a head-up display device according to an embodiment of the invention is mounted, FIG. 2 is a diagram showing the schematic structure of the head-up display device, and FIG. 3 is a perspective view of a second mirror of the head-up display device.

As shown in FIG. 1, a head-up display device 10 of this embodiment is disposed in a dashboard of an automobile, and reflects an image, which is emitted from the inside of the device and represents information, such as travel speed, by a front window (image reflective surface) 5 to enlarge and display the image as a virtual image 7 on the front side of a driver (observer) 6 behind a front window 5.

Figure 2:
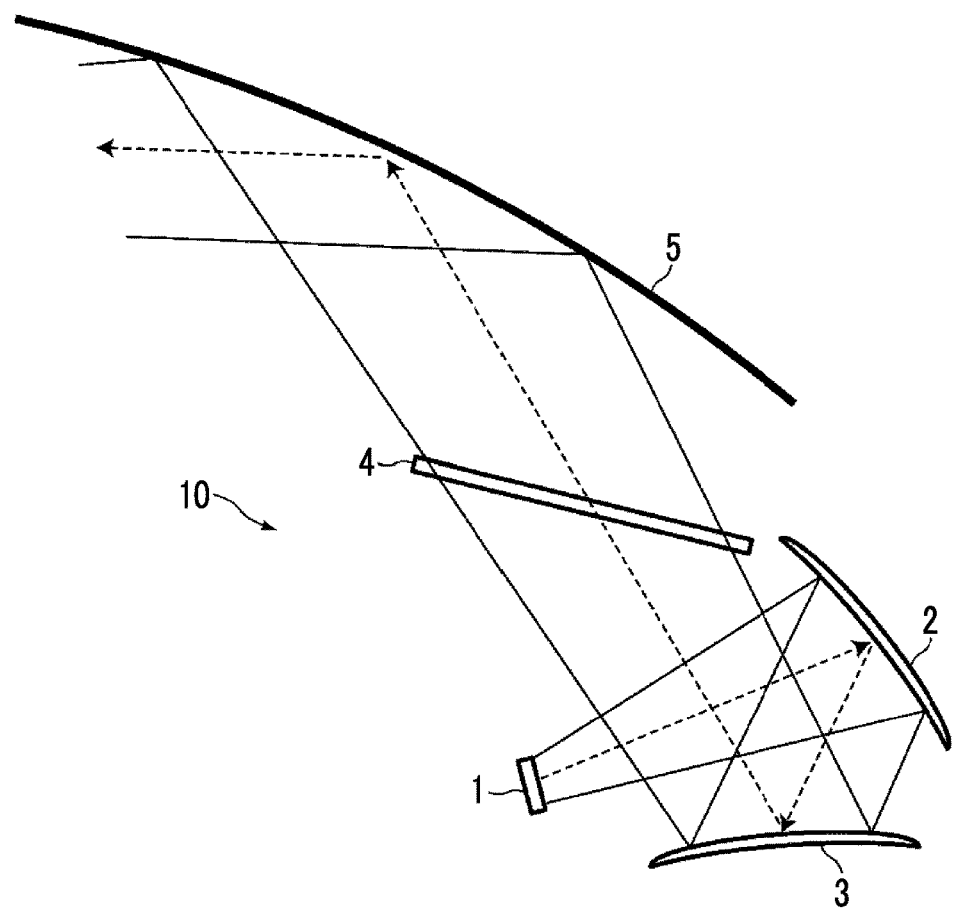
FIG. 2 is a diagram showing the schematic structure of the head-up display device according to the embodiment of the invention.
Figure 3:
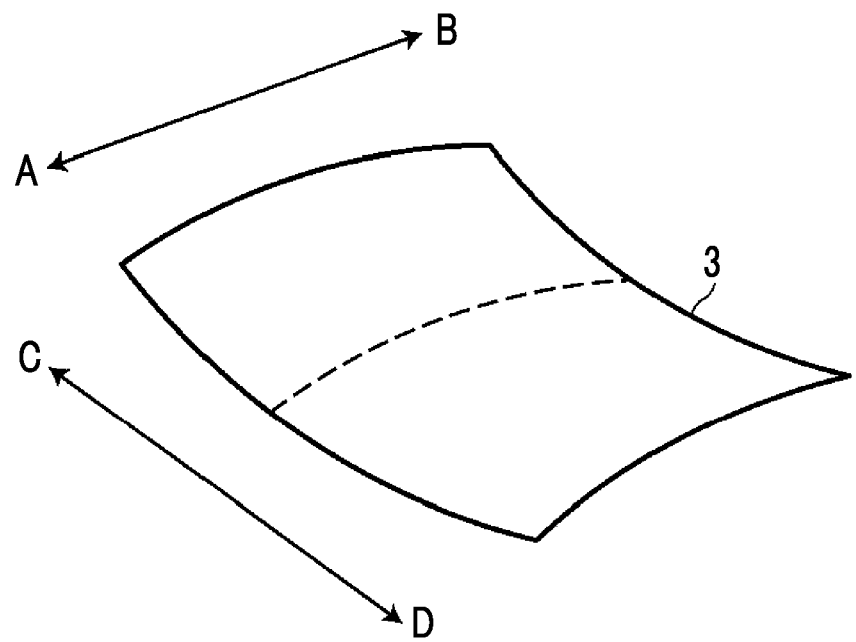
FIG. 3 is a perspective view of a second mirror of the head-up display device.

As shown in FIG. 2, the head-up display device 10 includes a first mirror 2 having power, a second mirror 3 having power, and a light-blocking member provided with an aperture 4. The head-up display device 10 is adapted so that display light emitted from an image display surface 1 is reflected by the first mirror 2 and the second mirror 3 in this order, passes through the aperture 4, and reaches the front window (image reflective surface) 5. A member having a convergence action is used as the image reflective surface (front window 5) that is combined with the head-up display device 10 of this embodiment.

Further, the image display surface 1 is disposed on the same side as the driver (observer) 6 and on the side opposite to the first mirror 2 with respect to luminous flux that travels toward the aperture 4 from the second mirror 3, the first mirror 2 is a concave mirror, and the shape of the cross-section of the second mirror 3 taken along a front-rear direction (the direction of arrow A-B in FIG. 3) is a convex shape in a case in which the direction of luminous flux traveling toward the first mirror 2 from the image display surface 1 is set to the front-rear direction on the reflective surface of the second mirror 3.

In regard to the image display surface 1, the image display surface 1 of FIG. 2 may be formed of the image display surface of an image display element, such as a liquid crystal display (LCD) or an organic light emitting diode (OLED), and a screen may be disposed on the image display surface 1 of FIG. 2 and an image may be projected to the screen by a projector device (not shown).

Further, the light-blocking member is formed as a housing of the device that covers all of the image display surface 1, the first mirror 2, and the second mirror 3. In FIG. 2, only the position of the aperture 4 is shown and the housing (light-blocking member) is not shown.

As described above, the head-up display device 10 of this embodiment bends and crosses the optical path of display light, which is emitted from the image display surface 1, by two mirrors of the first and second mirrors 2 and 3 to increase the length of the optical path in a limited space. Accordingly, the head-up display device 10 having a small size can be obtained.

Furthermore, since the first mirror 2 facing the image display surface 1 is formed of a concave mirror, the divergent light emitted from the image display surface 1 is converged by a reflective surface that makes an incidence angle and a reflection angle be relatively small. Accordingly, it is advantageous to have the correction of aberration.

Moreover, since the shape of the cross-section of the second mirror 3 taken along the front-rear direction (the direction of arrow A-B in FIG. 3) is a convex shape, it is possible to widen the eye box in a vertical direction while maintaining optical performance through the correction of aberration caused by the image reflective surface 5.

In the head-up display device 10 of this embodiment, it is preferable that the shape of an end portion of the second mirror 3, which is close to the driver (observer) 6 (the direction of arrow A in FIG. 3), in a lateral direction (the direction of arrow C-D in FIG. 3) is a concave shape as shown in FIG. 3 in a case in which a direction orthogonal to the front-rear direction is set to the lateral direction on the reflective surface of the second mirror 3. Since this structure is applied, an excessive increase in the divergence angle of light, which is reflected by the second mirror 3, in a lateral direction can be suppressed. Accordingly, it is possible to avoid a reduction in the angle of view that is caused by the widening of the eye box.

In this case, the shape of an end portion of the second mirror 3, which is close to the first mirror 2 (the direction of arrow B in FIG. 3), in the lateral direction may be a concave shape and may be a convex shape.

In a case in which the divergence angle of divergent light emitted from the image display surface 1 in a longitudinal direction in FIG. 2 is small, a difference between vectors, which represent the traveling direction of light by light incident on the side of the second mirror 3 close to the observer 6 and light incident on the side of the second mirror 3 close to the first mirror 2, is small. Accordingly, in a case in which the shapes of end portions of the second mirror 3 in the front-rear direction are set to a concave shape as in the second mirror 3 shown in FIG. 3, the second mirror 3 can be formed in the shape of a surface that reflects the entire image display light toward the image reflective surface 5.

Figure 4:
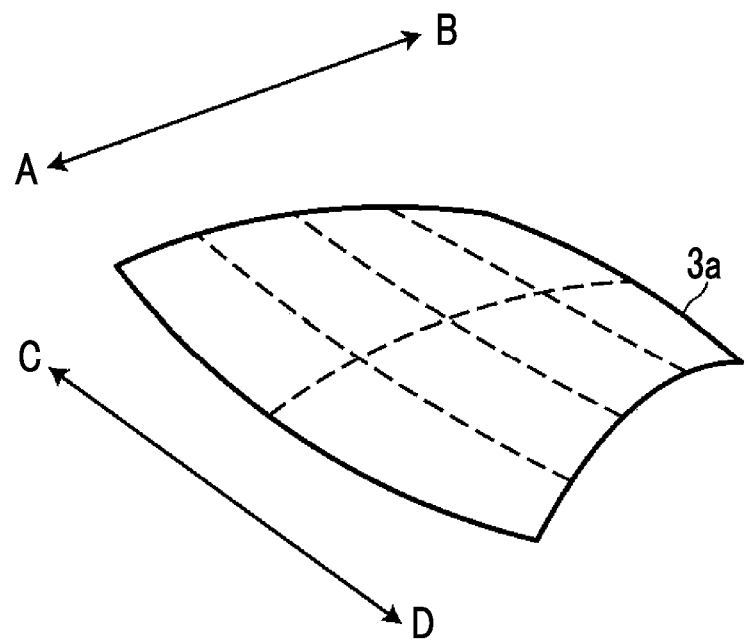
FIG. 4 is a perspective view of another aspect of the second mirror of the head-up display device.

On the contrary, in a case in which the divergence angle of divergent light emitted from the image display surface 1 in the longitudinal direction in FIG. 2 is large, a difference between vectors, which represent the traveling direction of light by light incident on the side of the second mirror 3 close to the observer 6 and light incident on the side of the second mirror 3 close to the first mirror 2, is large. Accordingly, in a case in which the shape of an end portion of a second mirror 3a close to the observer (the direction of arrow A in FIG. 4) is set to a concave shape and the shape of an end portion of the second mirror 3a close to the opposite side (the direction of arrow B in FIG. 4) is set to a convex shape as in the second mirror 3a shown in FIG. 4, the second mirror 3a can be formed in the shape of a surface that reflects the entire image display light toward the image reflective surface 5.

Figure 5:
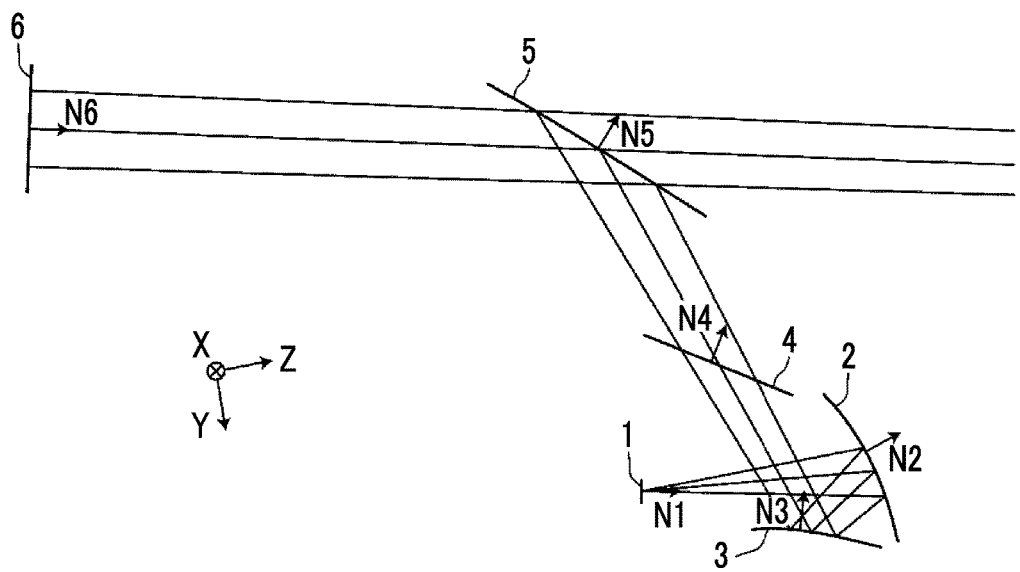
FIG. 5 is a diagram showing the structure of an example of the invention.
Figure 6:
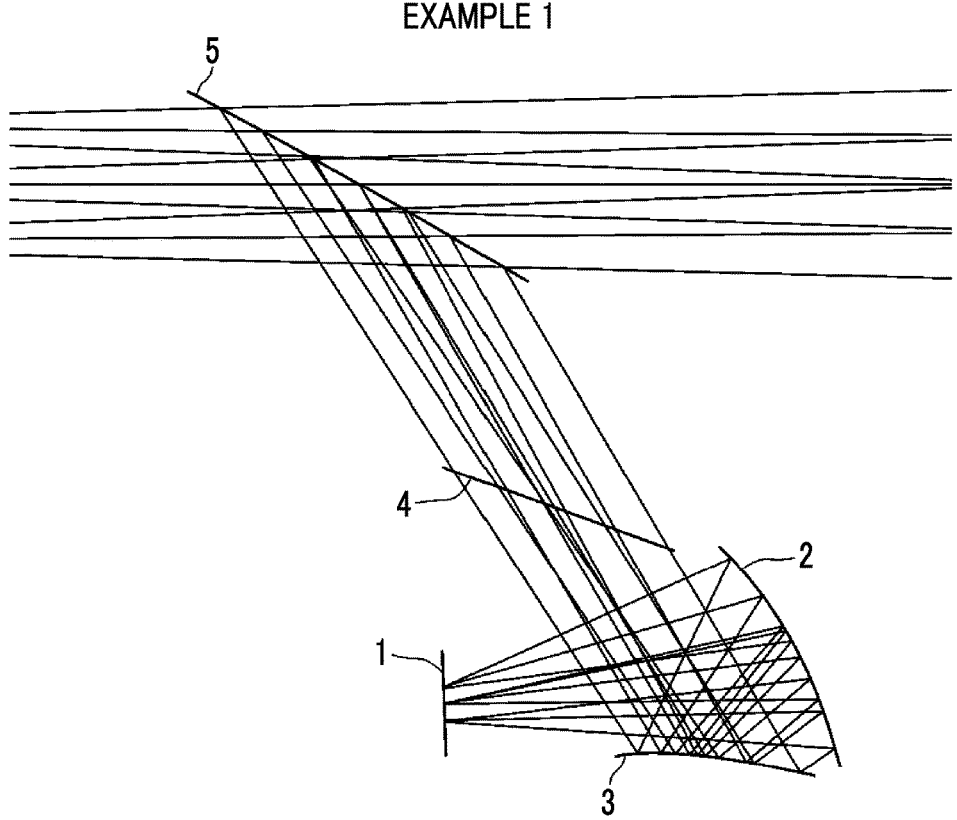
FIG. 6 is a diagram showing the schematic structure of a head-up display device of Example 1 of the invention.

Next, Examples of numerical values of the head-up display device of the invention will be described. First, a head-up display device of Example 1 will be described. FIG. 5 is a diagram showing the structure of Example, and FIG. 6 is a diagram showing the schematic structure of the head-up display device of Example 1.

Table 1 shows data regarding dimensions. Here, Table 1 shows values of FOV (Field Of View) [horizontal direction H×vertical direction V] (°), an eye box size (horizontal direction (mm)×vertical direction (mm)), a virtual image distance (mm), and an image display region (horizontal direction (mm)×vertical direction (mm)).

Table 2 shows arrangement coordinate data of the respective elements of the head-up display device. Here, a combination of an absolute coordinate system that has the center of the image display surface 1 shown in FIG. 5 (written in Table 2 as an image display portion) as an origin and local coordinate systems that are set on the surfaces of the respective elements, such as the first mirror 2, the second mirror 3, the aperture 4, the image reflective surface (written in Table 2 as a windshield) 5, the observer 6 (written in Table 2 as a pupil), and the virtual image 7, will be described.

The local coordinate systems will be set as described below. An origin and a Z-axis component vector of each local coordinate system are expressed as (x,y,z) and (i,j,k) in the absolute coordinate system, respectively. Further, a plane (X-Y plane), which passes through the origin of each local coordinate system and is orthogonal to a Z axis, is referred to as a reference plane of each element, and a normal vector N of each reference plane corresponds to the Z axis of the local coordinate system. Furthermore, an X axis is orthogonal to a display plane of FIG. 5 and the back side of the display plane is referred to as a positive side. Moreover, a Y axis and the Z axis are parallel to the display plane of FIG. 5. Further, the Y axis is set so as to correspond to the cross product of the Z axis and the X axis. Furthermore, the reference plane of each of the first mirror 2, the second mirror 3, and the image reflective surface (windshield) 5 has paraxial curvature, and a free-form surface shape is set thereto as an additional shape. Moreover, a rectangular aperture of which a long side corresponds to the X axis and a short side corresponds to the Y axis is set on the reference plane of an element having an aperture value.

Further, the first mirror 2, the second mirror 3, and the image reflective surface (windshield) 5 are reflective surfaces having power, and data regarding free-form surface coefficients of the respective surfaces are shown in Table 3. The free-form surface coefficient is the value of a rotationally asymmetric aspheric surface coefficient C(i,j) of a free-form surface equation expressed as the following equation. A rotationally asymmetric aspheric surface coefficient, which is not particularly written in Table 3, is 0.

$$Z = \sum_i \sum_j C(i,j) X^i X^j$$

where, X, Y, Z: coordinates using surface vertexes as origins

C(i, j): rotationally asymmetric aspheric surface coefficient (i+j=k, k=1 to 10)

TABLE 1

| Example 1 | |
|---|---|
| FOV[H × V] | 10° × 3.5° |
| EYE BOX SIZE [mm × mm] | 130 × 120 |
| VIRTUAL IMAGE DISTANCE [mm] | 10000 |
| IMAGE DISPLAY REGION [mm × mm] | 100 × 35 |

TABLE 2

| | COORDINATE OF ORIGIN | | | NORMAL VECTOR OF REFERENCE PLANE | | | APERTURE DATA | | |
|---|---|---|---|---|---|---|---|---|---|
| | x | y | z | i | j | k | APERTURE WIDTH X | APERTURE WIDTH Y | APERTURE Y SHIFT |
| ORIGIN OF ABSOLUTE COORDINATE | 0.00 | 0.00 | 0.00 | 0.0000 | 0.0000 | 1.0000 | | | |
| IMAGE DISPLAY PORTION | 0.00 | 0.00 | 0.00 | 0.0000 | 0.1736 | 0.9848 | | | |
| FIRST MIRROR | 0.00 | 62.51 | −354.53 | 0.0000 | −0.3421 | 0.9397 | 388 | 258 | −18.5 |
| SECOND MIRROR | 0.00 | −61.59 | −250.40 | 0.0000 | −0.9613 | 0.2756 | 382 | 206 | −27 |
| APERTURE | 0.00 | 203.30 | −109.56 | 0.0000 | −0.8481 | 0.5299 | 342 | 252 | −12.5 |
| WINDSHIELD | 0.00 | 538.82 | 68.84 | 0.0000 | −0.7431 | 0.6691 | | | |
| PUPIL | 0.00 | 570.23 | 968.29 | 0.0000 | 0.2079 | 0.9782 | | | |
| VIRTUAL IMAGE | 0.00 | 221.23 | −9025.62 | 0.0000 | 0.2079 | 0.9782 | | | |

TABLE 3

| | | Example 1 | | |
|---|---|---|---|---|
| PARAXIAL CURVATURE RADIUS $C(i, j)$ | | FIRST MIRROR | SECOND MIRROR | WINDSHIELD |
| | | 638.8722 | 969.3421 | ∞ |
| 1 | 0 | 0.0000000000E+00 | 0.0000000000E+00 | 0.0000000000E+00 |
| 0 | 1 | −2.5232895177E−02 | −1.6735086113E−02 | 9.5121514901E−03 |
| 2 | 0 | −2.4273405476E−04 | −5.8888647409E−04 | 1.1726714047E−04 |
| 1 | 1 | 0.0000000000E+00 | 0.0000000000E+00 | 0.0000000000E+00 |
| 0 | 2 | 3.3989983887E−04 | 3.2341887877E−04 | 6.6451462078E−05 |
| 3 | 0 | 0.0000000000E+00 | 0.0000000000E+00 | 0.0000000000E+00 |
| 2 | 1 | 2.8139191334E−07 | −3.4422120635E−07 | −4.0984711760E−08 |
| 1 | 2 | 0.0000000000E+00 | 0.0000000000E+00 | 0.0000000000E+00 |
| 0 | 3 | 6.5832123054E−07 | 2.4784486369E−06 | 5.8352454395E−08 |
| 4 | 0 | 5.5050433218E−10 | 1.2160955525E−09 | 1.8076488220E−10 |
| 3 | 1 | 0.0000000000E+00 | 0.0000000000E+00 | 0.0000000000E+00 |
| 2 | 2 | 2.4422971705E−09 | 9.5273858773E−10 | −8.5663602372E−11 |
| 1 | 3 | 0.0000000000E+00 | 0.0000000000E+00 | 0.0000000000E+00 |
| 0 | 4 | 4.9958283580E−09 | 3.6893108694E−08 | 5.1841972882E−11 |
| 5 | 0 | 0.0000000000E+00 | 0.0000000000E+00 | 0.0000000000E+00 |
| 4 | 1 | −1.2272727738E−11 | −1.5457297953E−11 | 1.6953219966E−13 |
| 3 | 2 | 0.0000000000E+00 | 0.0000000000E+00 | 0.0000000000E+00 |
| 2 | 3 | −6.1069075083E−12 | −5.7630276438E−11 | 9.4181254950E−14 |
| 1 | 4 | 0.0000000000E+00 | 0.0000000000E+00 | 0.0000000000E+00 |
| 0 | 5 | −1.6174593041E−11 | 3.6968109431E−10 | 4.3631225108E−14 |
| 6 | 0 | −3.7323114616E−14 | −5.3007444907E−14 | −5.7915957618E−15 |
| 5 | 1 | 0.0000000000E+00 | 0.0000000000E+00 | 0.0000000000E+00 |
| 4 | 2 | −4.4169412115E−14 | −1.6931875350E−14 | 1.2160292018E−15 |
| 3 | 3 | 0.0000000000E+00 | 0.0000000000E+00 | 0.0000000000E+00 |
| 2 | 4 | −7.5882459979E−14 | −9.0572799152E−13 | 3.9230162978E−16 |
| 1 | 5 | 0.0000000000E+00 | 0.0000000000E+00 | 0.0000000000E+00 |
| 0 | 6 | 3.2765918717E−14 | 9.9594464171E−13 | 2.0358629739E−16 |
| 7 | 0 | 0.0000000000E+00 | 0.0000000000E+00 | 0.0000000000E+00 |
| 6 | 1 | 2.5980257478E−16 | 2.3521285479E−16 | −2.9914127753E−18 |
| 5 | 2 | 0.0000000000E+00 | 0.0000000000E+00 | 0.0000000000E+00 |
| 3 | 4 | 1.8870262239E−16 | 1.1240976285E−15 | −7.1848493425E−18 |
| 4 | 3 | 0.0000000000E+00 | 0.0000000000E+00 | 0.0000000000E+00 |
| 2 | 5 | −7.3866440760E−17 | −2.7049997641E−15 | 5.6825058659E−20 |
| 1 | 6 | 0.0000000000E+00 | 0.0000000000E+00 | 0.0000000000E+00 |
| 0 | 7 | 3.0545497522E−15 | −3.6018154166E−16 | 5.7818036623E−19 |
| 8 | 0 | 1.5019831494E−18 | 2.1571461216E−18 | 1.4548651606E−19 |
| 7 | 1 | 0.0000000000E+00 | 0.0000000000E+00 | 0.0000000000E+00 |
| 6 | 2 | 6.6546214979E−20 | −1.6882911047E−18 | −4.0929595963E−20 |
| 5 | 3 | 0.0000000000E+00 | 0.0000000000E+00 | 0.0000000000E+00 |
| 4 | 4 | 8.7958863303E−18 | 2.7392981239E−17 | −1.2197758235E−20 |
| 3 | 5 | 0.0000000000E+00 | 0.0000000000E+00 | 0.0000000000E+00 |
| 2 | 6 | −6.6558870525E−18 | −5.2296885526E−18 | −5.1769216490E−21 |
| 1 | 7 | 0.0000000000E+00 | 0.0000000000E+00 | 0.0000000000E+00 |
| 0 | 8 | −3.9827606742E−18 | 2.7490880312E−17 | −6.4366746130E−21 |
| 9 | 0 | 0.0000000000E+00 | 0.0000000000E+00 | 0.0000000000E+00 |
| 8 | 1 | −1.3744345677E−21 | −6.1828087383E−22 | 2.2144541119E−23 |
| 7 | 2 | 0.0000000000E+00 | 0.0000000000E+00 | 0.0000000000E+00 |
| 6 | 3 | −8.0602311361E−21 | −2.2072580654E−20 | 1.4456081800E−22 |
| 5 | 4 | 0.0000000000E+00 | 0.0000000000E+00 | 0.0000000000E+00 |
| 4 | 5 | 2.0929383613E−20 | 1.0835557951E−19 | 1.2455653871E−23 |
| 3 | 6 | 0.0000000000E+00 | 0.0000000000E+00 | 0.0000000000E+00 |
| 2 | 7 | −4.4562334461E−20 | −6.2908798651E−19 | −6.9948609813E−24 |
| 1 | 8 | 0.0000000000E+00 | 0.0000000000E+00 | 0.0000000000E+00 |
| 0 | 9 | −1.2887912561E−19 | 3.0690841890E−19 | −7.3001740686E−24 |
| 10 | 0 | −2.2985663059E−23 | −3.2949005086E−23 | −1.3871955134E−24 |
| 9 | 1 | 0.0000000000E+00 | 0.0000000000E+00 | 0.0000000000E+00 |
| 8 | 2 | 2.6749827489E−23 | 8.8326170412E−23 | 5.3699663027E−25 |
| 7 | 3 | 0.0000000000E+00 | 0.0000000000E+00 | 0.0000000000E+00 |
| 6 | 4 | −1.3713070872E−22 | −6.7795546201E−22 | 2.5361779086E−25 |
| 5 | 5 | 0.0000000000E+00 | 0.0000000000E+00 | 0.0000000000E+00 |
| 4 | 6 | −2.2119871567E−22 | 7.8769200625E−22 | 5.3614470963E−26 |
| 3 | 7 | 0.0000000000E+00 | 0.0000000000E+00 | 0.0000000000E+00 |
| 2 | 8 | 8.1672249007E−22 | −2.8099920766E−21 | 8.4180607892E−26 |
| 1 | 9 | 0.0000000000E+00 | 0.0000000000E+00 | 0.0000000000E+00 |
| 0 | 10 | −4.1524642777E−22 | 7.6964306156E−22 | 8.2400402372E−26 |

Since signs, meanings, and description methods of the respective data mentioned in the description of Example 1 are the same as those in the following examples and the following reference example as long as the signs, meanings, and description methods of the respective data mentioned in the description of Example 1 are not particularly refused, the repeated description thereof will be omitted below.

Figure 7:
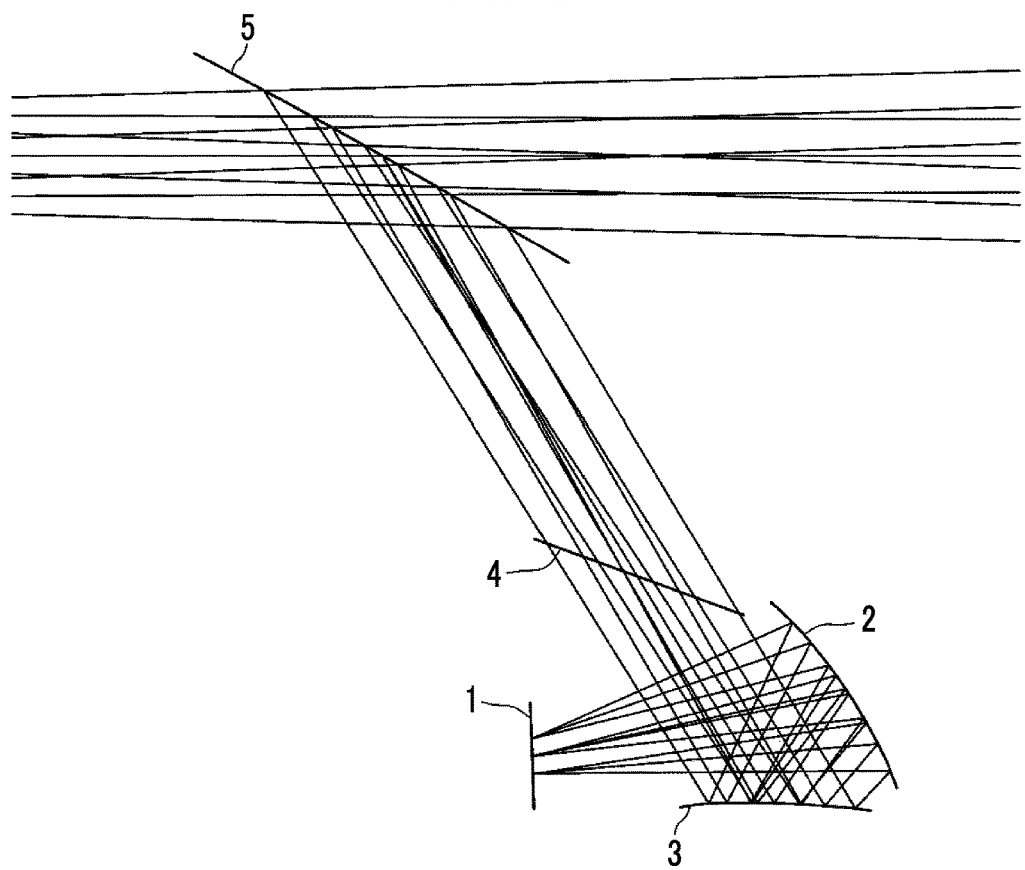
FIG. 7 is a diagram showing the schematic structure of a head-up display device of Example 2 of the invention.

Next, a head-up display device of Example 2 will be described. FIG. 7 is a diagram showing the schematic structure of the head-up display device of Example 2. Further, Table 4 shows data regarding dimensions of the head-up display device of Example 2, Table 5 shows arrangement coordinate data of the respective elements, and Table 6 shows data regarding free-form surface coefficients of the respective mirrors.

TABLE 4

Example 2

| | |
|---|---|
| FOV[H × V] | 10° × 3.5° |
| EYE BOX SIZE [mm × mm] | 130 × 80 |
| VIRTUAL IMAGE DISTANCE [mm] | 10000 |
| IMAGE DISPLAY REGION [mm × mm] | 93 × 32.55 |

TABLE 5

Example 2

| | COORDINATE OF ORIGIN | | | NORMAL VECTOR OF REFERENCE PLANE | | | APERTURE DATA | | |
|---|---|---|---|---|---|---|---|---|---|
| | x | y | z | i | j | k | APERTURE WIDTH X | APERTURE WIDTH Y | APERTURE Y SHIFT |
| ORIGIN OF ABSOLUTE COORDINATE | 0.00 | 0.00 | 0.00 | 0.0000 | 0.0000 | 1.0000 | | | |
| IMAGE DISPLAY PORTION | 0.00 | 0.00 | 0.00 | 0.0000 | 0.1736 | 0.9848 | | | |
| FIRST MIRROR | 0.00 | 52.09 | −295.44 | 0.0000 | −0.3421 | 0.9397 | 380 | 210 | 1 |
| SECOND MIRROR | 0.00 | −51.32 | −208.67 | 0.0000 | −0.9613 | 0.2756 | 380 | 178 | −17.5 |
| APERTURE | 0.00 | 169.42 | −91.30 | 0.0000 | −0.8481 | 0.5299 | 342 | 208 | −15.5 |
| WINDSHIELD | 0.00 | 566.74 | 119.96 | 0.0000 | −0.7431 | 0.6691 | | | |
| PUPIL | 0.00 | 598.15 | 1019.42 | 0.0000 | 0.2079 | 0.9782 | | | |
| VIRTUAL IMAGE | 0.00 | 249.16 | −8974.49 | 0.0000 | 0.2079 | 0.9782 | | | |

TABLE 6

Example 2

| PARAXIAL CURVATURE RADIUS $C(i, j)$ | | FIRST MIRROR | SECOND MIRROR | WINDSHIELD |
|---|---|---|---|---|
| | | 619.2304 | −2425.0992 | ∞ |
| 1 | 0 | 0.0000000000E+00 | 0.0000000000E+00 | 0.0000000000E+00 |
| 0 | 1 | 3.2850743311E−02 | 5.6148579595E−02 | 9.5121514901E−03 |
| 2 | 0 | −3.8277179394E−04 | −9.7064115742E−05 | 1.1726714047E−04 |
| 1 | 1 | 0.0000000000E+00 | 0.0000000000E+00 | 0.0000000000E+00 |
| 0 | 2 | 2.0036343575E−04 | 7.2848909964E−04 | 6.6451462078E−05 |
| 3 | 0 | 0.0000000000E+00 | 0.0000000000E+00 | 0.0000000000E+00 |
| 2 | 1 | −5.4913793564E−07 | −7.4532765343E−07 | −4.0984711760E−08 |
| 1 | 2 | 0.0000000000E+00 | 0.0000000000E+00 | 0.0000000000E+00 |
| 0 | 3 | 7.9922824997E−09 | 7.3458092834E−07 | 5.8352454395E−08 |
| 4 | 0 | 3.7975732067E−09 | 3.4248381282E−09 | 1.8076488220E−10 |
| 3 | 1 | 0.0000000000E+00 | 0.0000000000E+00 | 0.0000000000E+00 |
| 2 | 2 | 6.1519051420E−09 | 7.9951006742E−09 | −8.5663602372E−11 |
| 1 | 3 | 0.0000000000E+00 | 0.0000000000E+00 | 0.0000000000E+00 |
| 0 | 4 | 1.0230307393E−08 | 2.7278143377E−08 | 5.1841972882E−11 |
| 5 | 0 | 0.0000000000E+00 | 0.0000000000E+00 | 0.0000000000E+00 |
| 4 | 1 | 2.5901290821E−11 | −9.7155496759E−12 | 1.6953219966E−13 |
| 3 | 2 | 0.0000000000E+00 | 0.0000000000E+00 | 0.0000000000E+00 |
| 2 | 3 | −2.9186240177E−11 | −3.7329469641E−12 | 9.4181254950E−14 |
| 1 | 4 | 0.0000000000E+00 | 0.0000000000E+00 | 0.0000000000E+00 |
| 0 | 5 | 1.5909219193E−10 | 4.7394422395E−10 | 4.3631225108E−14 |
| 6 | 0 | −1.2578494427E−13 | −7.7494521997E−14 | −5.7915957618E−15 |
| 5 | 1 | 0.0000000000E+00 | 0.0000000000E+00 | 0.0000000000E+00 |
| 4 | 2 | −4.3525963668E−13 | −6.3537273965E−13 | 1.2160292018E−15 |
| 3 | 3 | 0.0000000000E+00 | 0.0000000000E+00 | 0.0000000000E+00 |
| 2 | 4 | 5.8950435706E−13 | 4.6640735878E−13 | 3.9230162978E−16 |
| 1 | 5 | 0.0000000000E+00 | 0.0000000000E+00 | 0.0000000000E+00 |
| 0 | 6 | −2.1364747760E−12 | 2.6629041236E−12 | 2.0358629739E−16 |
| 7 | 0 | 0.0000000000E+00 | 0.0000000000E+00 | 0.0000000000E+00 |
| 6 | 1 | −1.4718025123E−15 | 3.6069585730E−16 | −2.9914127753E−18 |
| 5 | 2 | 0.0000000000E+00 | 0.0000000000E+00 | 0.0000000000E+00 |
| 3 | 4 | 2.2028323980E−15 | −8.0281252423E−16 | −7.1848493425E−18 |
| 4 | 3 | 0.0000000000E+00 | 0.0000000000E+00 | 0.0000000000E+00 |
| 2 | 5 | −3.5847943549E−15 | −2.2859621276E−14 | 5.6825058659E−20 |

TABLE 6-continued

Example 2

| PARAXIAL CURVATURE RADIUS C(i, j) | | FIRST MIRROR | SECOND MIRROR | WINDSHIELD |
|---|---|---|---|---|
| 1 | 6 | 0.0000000000E+00 | 0.0000000000E+00 | 0.0000000000E+00 |
| 0 | 7 | −4.5405662705E−15 | 2.2492915194E−14 | 5.7818036623E−19 |
| 8 | 0 | 3.6398537733E−20 | −6.1523356070E−19 | 1.4548651606E−19 |
| 7 | 1 | 0.0000000000E+00 | 0.0000000000E+00 | 0.0000000000E+00 |
| 6 | 2 | 2.1907843571E−17 | 3.1346118392E−17 | −4.0929595963E−20 |
| 5 | 3 | 0.0000000000E+00 | 0.0000000000E+00 | 0.0000000000E+00 |
| 4 | 4 | −2.5436675449E−17 | −5.4000304856E−17 | −1.2197758235E−20 |
| 3 | 5 | 0.0000000000E+00 | 0.0000000000E+00 | 0.0000000000E+00 |
| 2 | 6 | −4.6997752992E−17 | −2.6824098943E−16 | −5.1769216490E−21 |
| 1 | 7 | 0.0000000000E+00 | 0.0000000000E+00 | 0.0000000000E+00 |
| 0 | 8 | 2.9383710457E−16 | 1.8165136670E−16 | −6.4366746130E−21 |
| 9 | 0 | 0.0000000000E+00 | 0.0000000000E+00 | 0.0000000000E+00 |
| 8 | 1 | 3.1381302742E−20 | −3.9496006148E−21 | 2.2144541119E−23 |
| 7 | 2 | 0.0000000000E+00 | 0.0000000000E+00 | 0.0000000000E+00 |
| 6 | 3 | −5.0794788864E−20 | 1.1546437059E−20 | 1.4456081800E−22 |
| 5 | 4 | 0.0000000000E+00 | 0.0000000000E+00 | 0.0000000000E+00 |
| 4 | 5 | 3.0356555616E−20 | 1.7732433652E−19 | 1.2455653871E−23 |
| 3 | 6 | 0.0000000000E+00 | 0.0000000000E+00 | 0.0000000000E+00 |
| 2 | 7 | −7.0524012719E−20 | 1.6237844407E−18 | −6.9948609813E−24 |
| 1 | 8 | 0.0000000000E+00 | 0.0000000000E+00 | 0.0000000000E+00 |
| 0 | 9 | −4.4840435358E−19 | −5.2319185821E−19 | −7.3001740686E−24 |
| 10 | 0 | 4.7752008418E−23 | 3.8096448835E−23 | −1.3871955134E−24 |
| 9 | 1 | 0.0000000000E+00 | 0.0000000000E+00 | 0.0000000000E+00 |
| 8 | 2 | −3.2530321489E−22 | −4.8463738129E−22 | 5.3699663027E−25 |
| 7 | 3 | 0.0000000000E+00 | 0.0000000000E+00 | 0.0000000000E+00 |
| 6 | 4 | 3.1910807498E−22 | 7.9585965803E−22 | 2.5361779086E−25 |
| 5 | 5 | 0.0000000000E+00 | 0.0000000000E+00 | 0.0000000000E+00 |
| 4 | 6 | 6.9273775357E−22 | 4.0614001347E−21 | 5.3614470963E−26 |
| 3 | 7 | 0.0000000000E+00 | 0.0000000000E+00 | 0.0000000000E+00 |
| 2 | 8 | 4.4929425029E−21 | 2.8054241189E−20 | 8.4180607892E−26 |
| 1 | 9 | 0.0000000000E+00 | 0.0000000000E+00 | 0.0000000000E+00 |
| 0 | 10 | −1.0931184482E−20 | −3.3528179194E−21 | 8.2400402372E−26 |

Figure 8:
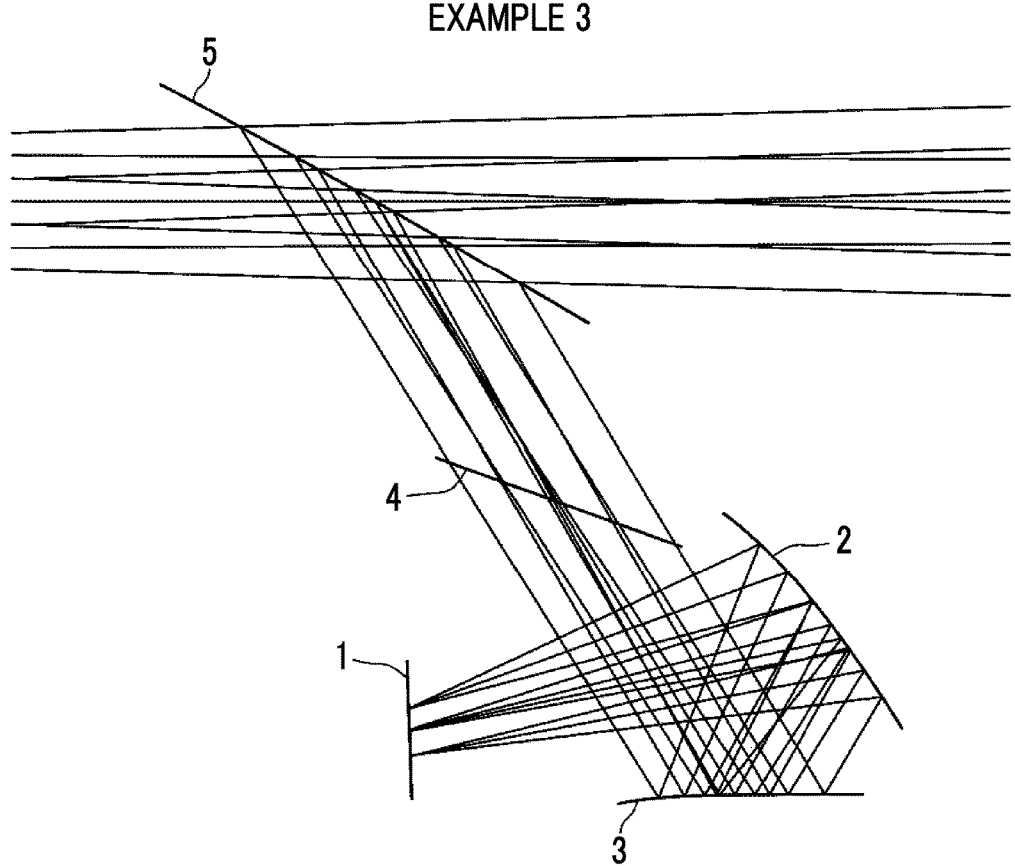
FIG. 8 is a diagram showing the schematic structure of a head-up display device of Example 3 of the invention.

Next, a head-up display device of Example 3 will be described. FIG. 8 is a diagram showing the schematic structure of the head-up display device of Example 3. Further, Table 7 shows data regarding dimensions of the head-up display device of Example 3, Table 8 shows arrangement coordinate data of the respective elements, and Table 9 shows data regarding free-form surface coefficients of the respective mirrors.

TABLE 7

Example 3

| FOV[H × V] | 10° × 3.5° |
|---|---|
| EYE BOX SIZE [mm × mm] | 130 × 80 |
| VIRTUAL IMAGE DISTANCE [mm] | 10000 |
| IMAGE DISPLAY REGION [mm × mm] | 103 × 36.05 |

TABLE 8

Example 3

| | COORDINATE OF ORIGIN | | | NORMAL VECTOR OF REFERENCE PLANE | | | APERTURE DATA | | |
|---|---|---|---|---|---|---|---|---|---|
| | x | y | z | i | j | k | APERTURE WIDTH X | APERTURE WIDTH Y | APERTURE Y SHIFT |
| ORIGIN OF ABSOLUTE COORDINATE | 0.00 | 0.00 | 0.00 | 0.0000 | 0.0000 | 1.0000 | | | |
| IMAGE DISPLAY PORTION | 0.00 | 0.00 | 0.00 | 0.0000 | 0.1736 | 0.9848 | | | |
| FIRST MIRROR | 0.00 | 62.51 | −354.53 | 0.0000 | −0.3421 | 0.9397 | 358 | 226 | 25 |
| SECOND MIRROR | 0.00 | −61.59 | −250.40 | 0.0000 | −0.9613 | 0.2756 | 368 | 198 | −17.5 |
| APERTURE | 0.00 | 185.64 | −118.95 | 0.0000 | −0.9272 | 0.3746 | 326 | 212 | −9.5 |
| WINDSHIELD | 0.00 | 432.86 | 12.50 | 0.0000 | −0.7431 | 0.6691 | | | |
| PUPIL | 0.00 | 464.27 | 911.96 | 0.0000 | 0.2079 | 0.9782 | | | |
| VIRTUAL IMAGE | 0.00 | 115.28 | −9081.95 | 0.0000 | 0.2079 | 0.9782 | | | |

TABLE 9

| | | Example 3 | | |
| --- | --- | --- | --- | --- |
| PARAXIAL CURVATURE RADIUS C(i, j) | | FIRST MIRROR | SECOND MIRROR | WINDSHIELD |
| | | 1026.651 | 4761.9555 | ∞ |
| 1 | 0 | 0.0000000000E+00 | 0.0000000000E+00 | 0.0000000000E+00 |
| 0 | 1 | 7.3220964076E−02 | 8.9390516516E−02 | 9.5121514901E−03 |
| 2 | 0 | −8.3477206640E−05 | −3.0007327961E−04 | 1.1726714047E−04 |
| 1 | 1 | 0.0000000000E+00 | 0.0000000000E+00 | 0.0000000000E+00 |
| 0 | 2 | 8.0681102018E−05 | 2.4367452272E−04 | 6.6451462078E−05 |
| 3 | 0 | 0.0000000000E+00 | 0.0000000000E+00 | 0.0000000000E+00 |
| 2 | 1 | 2.1796127494E−07 | −3.2873648872E−07 | −4.0984711760E−08 |
| 1 | 2 | 0.0000000000E+00 | 0.0000000000E+00 | 0.0000000000E+00 |
| 0 | 3 | 2.2092923530E−06 | 3.2116002837E−06 | 5.8352454395E−08 |
| 4 | 0 | 5.5805809196E−10 | 4.5231467688E−10 | 1.8076488220E−10 |
| 3 | 1 | 0.0000000000E+00 | 0.0000000000E+00 | 0.0000000000E+00 |
| 2 | 2 | −2.8810982374E−09 | −9.3945543657E−10 | −8.5663602372E−11 |
| 1 | 3 | 0.0000000000E+00 | 0.0000000000E+00 | 0.0000000000E+00 |
| 0 | 4 | 2.2253952331E−09 | 1.8174171055E−08 | 5.1841972882E−11 |
| 5 | 0 | 0.0000000000E+00 | 0.0000000000E+00 | 0.0000000000E+00 |
| 4 | 1 | 3.3030653699E−12 | 3.5329380955E−13 | 1.6953219966E−13 |
| 3 | 2 | 0.0000000000E+00 | 0.0000000000E+00 | 0.0000000000E+00 |
| 2 | 3 | 6.7355211567E−11 | 2.3792383056E−11 | 9.4181254950E−14 |
| 1 | 4 | 0.0000000000E+00 | 0.0000000000E+00 | 0.0000000000E+00 |
| 0 | 5 | −1.9379280978E−11 | 1.2784389596E−10 | 4.3631225108E−14 |
| 6 | 0 | 1.7946121415E−15 | 3.6414221931E−15 | −5.7915957618E−15 |
| 5 | 1 | 0.0000000000E+00 | 0.0000000000E+00 | 0.0000000000E+00 |
| 4 | 2 | −2.0871610587E−14 | −7.9575619615E−14 | 1.2160292018E−15 |
| 3 | 3 | 0.0000000000E+00 | 0.0000000000E+00 | 0.0000000000E+00 |
| 2 | 4 | −2.4280169933E−13 | −1.9353600705E−13 | 3.9230162978E−16 |
| 1 | 5 | 0.0000000000E+00 | 0.0000000000E+00 | 0.0000000000E+00 |
| 0 | 6 | 5.3202342315E−13 | 2.5510173083E−13 | 2.0358629739E−16 |
| 7 | 0 | 0.0000000000E+00 | 0.0000000000E+00 | 0.0000000000E+00 |
| 6 | 1 | −1.1141973117E−16 | −7.8028019609E−17 | −2.9914127753E−18 |
| 5 | 2 | 0.0000000000E+00 | 0.0000000000E+00 | 0.0000000000E+00 |
| 3 | 4 | −3.0085791740E−16 | 3.1872418620E−16 | −7.1848493425E−18 |
| 4 | 3 | 0.0000000000E+00 | 0.0000000000E+00 | 0.0000000000E+00 |
| 2 | 5 | −1.4431099067E−15 | −1.1407499808E−15 | 5.6825058659E−20 |
| 1 | 6 | 0.0000000000E+00 | 0.0000000000E+00 | 0.0000000000E+00 |
| 0 | 7 | −3.2222565325E−15 | −1.4862003877E−15 | 5.7818036623E−19 |
| 8 | 0 | 3.2908586371E−20 | −1.1087721231E−20 | 1.4548651606E−19 |
| 7 | 1 | 0.0000000000E+00 | 0.0000000000E+00 | 0.0000000000E+00 |
| 6 | 2 | −2.0311136011E−18 | 1.4100946571E−18 | −4.0929595963E−20 |
| 5 | 3 | 0.0000000000E+00 | 0.0000000000E+00 | 0.0000000000E+00 |
| 4 | 4 | 5.8811378223E−18 | −1.4684454262E−18 | −1.2197758235E−20 |
| 3 | 5 | 0.0000000000E+00 | 0.0000000000E+00 | 0.0000000000E+00 |
| 2 | 6 | −1.1661990726E−18 | −2.0770849000E−18 | −5.1769216490E−21 |
| 1 | 7 | 0.0000000000E+00 | 0.0000000000E+00 | 0.0000000000E+00 |
| 0 | 8 | 2.3387449951E−18 | 1.6388328167E−17 | −6.4366746130E−21 |
| 9 | 0 | 0.0000000000E+00 | 0.0000000000E+00 | 0.0000000000E+00 |
| 8 | 1 | 5.5694056896E−21 | 4.0471669437E−21 | 2.2144541119E−23 |
| 7 | 2 | 0.0000000000E+00 | 0.0000000000E+00 | 0.0000000000E+00 |
| 6 | 3 | 1.3584770417E−20 | −3.1978485487E−21 | 1.4456081800E−22 |
| 5 | 4 | 0.0000000000E+00 | 0.0000000000E+00 | 0.0000000000E+00 |
| 4 | 5 | 2.5648770698E−20 | −1.2617723695E−19 | 1.2455653871E−23 |
| 3 | 6 | 0.0000000000E+00 | 0.0000000000E+00 | 0.0000000000E+00 |
| 2 | 7 | 1.1670155257E−19 | 1.2209996304E−19 | −6.9948609813E−24 |
| 1 | 8 | 0.0000000000E+00 | 0.0000000000E+00 | 0.0000000000E+00 |
| 0 | 9 | −1.4944040435E−19 | −2.4274771365E−20 | −7.3001740686E−24 |
| 10 | 0 | −4.3331500265E−24 | −9.5682078974E−25 | −1.3871955134E−24 |
| 9 | 1 | 0.0000000000E+00 | 0.0000000000E+00 | 0.0000000000E+00 |
| 8 | 2 | 4.3167096418E−23 | −1.5355197677E−23 | 5.3699663027E−25 |
| 7 | 3 | 0.0000000000E+00 | 0.0000000000E+00 | 0.0000000000E+00 |
| 6 | 4 | −1.5330294947E−22 | −3.1064642861E−23 | 2.5361779086E−25 |
| 5 | 5 | 0.0000000000E+00 | 0.0000000000E+00 | 0.0000000000E+00 |
| 4 | 6 | −3.2311797243E−22 | −7.0062263921E−22 | 5.3614470963E−26 |
| 3 | 7 | 0.0000000000E+00 | 0.0000000000E+00 | 0.0000000000E+00 |
| 2 | 8 | −3.0354253873E−22 | 6.7118141516E−22 | 8.4180607892E−26 |
| 1 | 9 | 0.0000000000E+00 | 0.0000000000E+00 | 0.0000000000E+00 |
| 0 | 10 | 1.1152824273E−21 | −6.1014558775E−22 | 8.2400402372E−26 |

Figure 9:
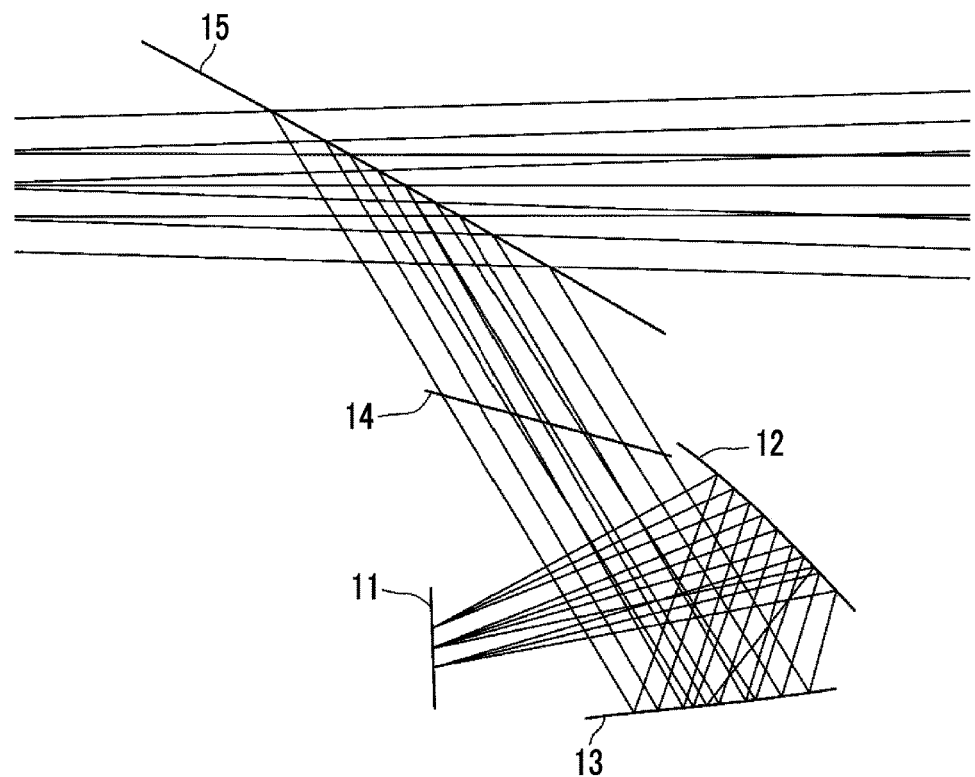
FIG. 9 is a diagram showing the schematic structure of a head-up display device of Reference example 1 of the invention.

Next, a head-up display device of Reference example 1 will be described. FIG. 9 is a diagram showing the schematic structure of the head-up display device of Reference example 1. As in the head-up display device of each of Examples, the head-up display device of Reference example 1 includes a first mirror 12, a second mirror 13 having power, and a light-blocking member provided with an aperture 14, and is adapted so that display light emitted from an image display surface 11 is reflected by the first mirror 12 and the second mirror 13 in this order, passes through the aperture 14, and reaches a front window (image reflective surface) 15. However, unlike in the invention, the shape of the cross-section of only the second mirror 13 taken along a front-rear direction is not a convex shape. Further, Table 10 shows data regarding dimensions of the head-up display device of Reference example 1, Table 11 shows arrangement coordinate data of the respective elements, and Table 12 shows data regarding free-form surface coefficients of the respective mirrors.

TABLE 10

| Reference example 1 | |
|---|---|
| FOV[H × V] | 10° × 3.5° |
| EYE BOX SIZE [mm × mm] | 130 × 40 |
| VIRTUAL IMAGE DISTANCE [mm] | 10000 |
| IMAGE DISPLAY REGION [mm × mm] | 65 × 22.75 |

TABLE 11

Reference example 1

| | COORDINATE OF ORIGIN | | | NORMAL VECTOR OF REFERENCE PLANE | | | APERTURE DATA | | |
|---|---|---|---|---|---|---|---|---|---|
| | x | y | z | i | j | k | APERTURE WIDTH X | APERTURE WIDTH Y | APERTURE Y SHIFT |
| ORIGIN OF ABSOLUTE COORDINATE | 0.00 | 0.00 | 0.00 | 0.0000 | 0.0000 | 1.0000 | | | |
| IMAGE DISPLAY PORTION | 0.00 | 0.00 | 0.00 | 0.0000 | 0.1736 | 0.9848 | | | |
| FIRST MIRROR | 0.00 | 39.59 | −224.54 | 0.0000 | −0.3421 | 0.9397 | 316 | 138 | 35 |
| SECOND MIRROR | 0.00 | −39.00 | −158.59 | 0.0000 | −0.9613 | 0.2756 | 344 | 144 | −2.5 |
| APERTURE | 0.00 | 130.52 | −68.45 | 0.0000 | −0.8910 | 0.4540 | 310 | 148 | −3.5 |
| WINDSHIELD | 0.00 | 271.79 | 6.67 | 0.0000 | −0.7431 | 0.6691 | | | |
| PUPIL | 0.00 | 303.20 | 906.12 | 0.0000 | 0.2079 | 0.9782 | | | |
| VIRTUAL IMAGE | 0.00 | −45.79 | −9087.79 | 0.0000 | 0.2079 | 0.9782 | | | |

TABLE 12

Reference example 1

| PARAXIAL CURVATURE RADIUS $C(i, j)$ | | FIRST MIRROR | SECOND MIRROR | WINDSHIELD |
|---|---|---|---|---|
| | | 806.2001 | −2246.2573 | ∞ |
| 1 | 0 | 0.0000000000E+00 | 0.0000000000E+00 | 0.0000000000E+00 |
| 0 | 1 | 2.0438472345E−01 | 1.7760783985E−01 | 9.5121514901E−03 |
| 2 | 0 | −1.9814043999E−04 | −3.4800604369E−04 | 1.1726714047E−04 |
| 1 | 1 | 0.0000000000E+00 | 0.0000000000E+00 | 0.0000000000E+00 |
| 0 | 2 | −2.4369448242E−04 | 2.2569095431E−05 | 6.6451462078E−05 |
| 3 | 0 | 0.0000000000E+00 | 0.0000000000E+00 | 0.0000000000E+00 |
| 2 | 1 | −1.8389930857E−06 | −2.6614269464E−07 | −4.0984711760E−08 |
| 1 | 2 | 0.0000000000E+00 | 0.0000000000E+00 | 0.0000000000E+00 |
| 0 | 3 | 2.6801106854E−06 | 1.6325563874E−06 | 5.8352454395E−08 |
| 4 | 0 | −3.2870221943E−09 | 4.3586592331E−10 | 1.8076488220E−10 |
| 3 | 1 | 0.0000000000E+00 | 0.0000000000E+00 | 0.0000000000E+00 |
| 2 | 2 | 2.8717815598E−08 | 1.1121078702E−08 | −8.5663602372E−11 |
| 1 | 3 | 0.0000000000E+00 | 0.0000000000E+00 | 0.0000000000E+00 |
| 0 | 4 | −2.7177271450E−09 | 5.9351285506E−09 | 5.1841972882E−11 |
| 5 | 0 | 0.0000000000E+00 | 0.0000000000E+00 | 0.0000000000E+00 |
| 4 | 1 | 1.3708912074E−10 | 3.0782425529E−11 | 1.6953219966E−13 |
| 3 | 2 | 0.0000000000E+00 | 0.0000000000E+00 | 0.0000000000E+00 |
| 2 | 3 | −1.6193249493E−10 | −1.0257995262E−10 | 9.4181254950E−14 |
| 1 | 4 | 0.0000000000E+00 | 0.0000000000E+00 | 0.0000000000E+00 |
| 0 | 5 | −1.5977878722E−10 | 5.6464918020E−11 | 4.3631225108E−14 |
| 6 | 0 | −6.5995099481E−14 | −4.6086522070E−14 | −5.7915957618E−15 |
| 5 | 1 | 0.0000000000E+00 | 0.0000000000E+00 | 0.0000000000E+00 |
| 4 | 2 | −5.1582400714E−13 | −6.3169921243E−13 | 1.2160292018E−15 |
| 3 | 3 | 0.0000000000E+00 | 0.0000000000E+00 | 0.0000000000E+00 |
| 2 | 4 | 2.9603074813E−12 | 5.8339768450E−14 | 3.9230162978E−16 |
| 1 | 5 | 0.0000000000E+00 | 0.0000000000E+00 | 0.0000000000E+00 |
| 0 | 6 | 5.9354692314E−12 | 1.5642404672E−12 | 2.0358629739E−16 |
| 7 | 0 | 0.0000000000E+00 | 0.0000000000E+00 | 0.0000000000E+00 |
| 6 | 1 | −3.5605278281E−15 | −5.3333185623E−16 | −2.9914127753E−18 |
| 5 | 2 | 0.0000000000E+00 | 0.0000000000E+00 | 0.0000000000E+00 |

TABLE 12-continued

Reference example 1

| PARAXIAL CURVATURE RADIUS C(i, j) | | FIRST MIRROR | SECOND MIRROR | WINDSHIELD |
|---|---|---|---|---|
| 3 | 4 | 4.6218257042E−15 | 2.3988778380E−15 | −7.1848493425E−18 |
| 4 | 3 | 0.0000000000E+00 | 0.0000000000E+00 | 0.0000000000E+00 |
| 2 | 5 | −5.3694582741E−14 | 4.7693566146E−15 | 5.6825058659E−20 |
| 1 | 6 | 0.0000000000E+00 | 0.0000000000E+00 | 0.0000000000E+00 |
| 0 | 7 | −6.0785621257E−14 | 3.0794274355E−14 | 5.7818036623E−19 |
| 8 | 0 | 1.2021900686E−17 | 1.5397122870E−18 | 1.4548651606E−19 |
| 7 | 1 | 0.0000000000E+00 | 0.0000000000E+00 | 0.0000000000E+00 |
| 6 | 2 | −2.0214742147E−17 | 2.9475730258E−17 | −4.0929595963E−20 |
| 5 | 3 | 0.0000000000E+00 | 0.0000000000E+00 | 0.0000000000E+00 |
| 4 | 4 | 1.2699151285E−17 | −6.8587899814E−18 | −1.2197758235E−20 |
| 3 | 5 | 0.0000000000E+00 | 0.0000000000E+00 | 0.0000000000E+00 |
| 2 | 6 | 2.4648542562E−16 | −6.3993924551E−17 | −5.1769216490E−21 |
| 1 | 7 | 0.0000000000E+00 | 0.0000000000E+00 | 0.0000000000E+00 |
| 0 | 8 | 1.9586766596E−16 | −1.2409711829E−16 | −6.4366746130E−21 |
| 9 | 0 | 0.0000000000E+00 | 0.0000000000E+00 | 0.0000000000E+00 |
| 8 | 1 | 5.7181102755E−20 | −6.3908813273E−21 | 2.2144541119E−23 |
| 7 | 2 | 0.0000000000E+00 | 0.0000000000E+00 | 0.0000000000E+00 |
| 6 | 3 | −6.5302616910E−21 | −8.0792854056E−21 | 1.4456081800E−22 |
| 5 | 4 | 0.0000000000E+00 | 0.0000000000E+00 | 0.0000000000E+00 |
| 4 | 5 | −3.5987097967E−20 | 1.4253082703E−19 | 1.2455653871E−23 |
| 3 | 6 | 0.0000000000E+00 | 0.0000000000E+00 | 0.0000000000E+00 |
| 2 | 7 | 2.0512576175E−18 | −2.6574575137E−18 | −6.9948609813E−24 |
| 1 | 8 | 0.0000000000E+00 | 0.0000000000E+00 | 0.0000000000E+00 |
| 0 | 9 | 1.7349566568E−18 | −2.0393394362E−18 | −7.3001740686E−24 |
| 10 | 0 | −1.9885466384E−22 | 9.4100857820E−24 | −1.3871955134E−24 |
| 9 | 1 | 0.0000000000E+00 | 0.0000000000E+00 | 0.0000000000E+00 |
| 8 | 2 | 6.7628299627E−22 | −5.4551678052E−22 | 5.3699663027E−25 |
| 7 | 3 | 0.0000000000E+00 | 0.0000000000E+00 | 0.0000000000E+00 |
| 6 | 4 | −1.8378028472E−21 | 2.2932707803E−22 | 2.5361779086E−25 |
| 5 | 5 | 0.0000000000E+00 | 0.0000000000E+00 | 0.0000000000E+00 |
| 4 | 6 | 3.8552277561E−21 | 8.4387982043E−22 | 5.3614470963E−26 |
| 3 | 7 | 0.0000000000E+00 | 0.0000000000E+00 | 0.0000000000E+00 |
| 2 | 8 | −2.1790812089E−20 | 5.0120670640E−22 | 8.4180607892E−26 |
| 1 | 9 | 0.0000000000E+00 | 0.0000000000E+00 | 0.0000000000E+00 |
| 0 | 10 | −1.0371249630E−20 | 2.3332497392E−20 | 8.2400402372E−26 |

It is understood from the above-mentioned data that each of the head-up display devices of Examples 1 to 3 is a head-up display device which has a small size and of which the range of an eye box in a vertical direction is wide since all the ranges of the eye boxes of the head-up display devices of Examples 1 to 3 in the vertical direction are wider than double or more the range of the eye box of the head-up display device of Reference example 1 in the vertical direction.

The invention has been described above using the embodiment and the examples, but the invention is not limited to the embodiment and the examples and may have various modifications. For example, the positions and sizes of the respective elements of the head-up display device are not limited to values described in the respective examples of numerical values, and may be set to other values.

EXPLANATION OF REFERENCES

1, 11: image display surface
2, 12: first mirror
3, 3a, 13: second mirror
4, 14: aperture
5, 15: front window (image reflective surface)
6: driver (observer)
7: virtual image plane
10: head-up display device

What is claimed is:

1. A head-up display device that reflects display light of an image, which is displayed on an image display surface, toward an observer by an image reflective surface facing the observer to enlarge and display the image as a virtual image to the observer behind the image reflective surface, the head-up display device comprising:

a first mirror having power;

a second mirror having power; and a light-blocking member that is provided with an aperture, wherein the image reflective surface has a convergence action, display light emitted from the image display surface is reflected by the first mirror and the second mirror in this order, passes through the aperture, and reaches the image reflective surface, the image display surface is disposed on the same side as the observer and on a side opposite to the first mirror with respect to luminous flux that travels toward the aperture from the second mirror, the first mirror is a concave mirror, a shape of a cross-section of the second mirror taken along a front-rear direction is a convex shape in a case in which a direction of luminous flux traveling toward the first mirror from the image display surface is set to the front-rear direction on a reflective surface of the second mirror, and a shape of an end portion of the second mirror, which is close to the observer, in a lateral direction is a concave shape in a case in which a direction orthogonal to the front-rear direction is set to the lateral direction on the reflective surface of the second mirror.

2. The head-up display device according to claim 1, wherein a shape of an end portion of the second mirror, which is close to the first mirror, in the lateral direction is a concave shape.

3. The head-up display device according to claim 1, wherein a shape of an end portion of the second mirror, which is close to the first mirror, in the lateral direction is a convex shape.

* * * * *